United States Patent
Caffier et al.

(10) Patent No.: US 11,891,530 B2
(45) Date of Patent: Feb. 6, 2024

(54) WRITING GEL INK

(71) Applicant: SOCIETE BIC, Clichy (FR)

(72) Inventors: Guillaume Caffier, Wegscheid (FR); Anne-Lise Damiano, Lagny sur Marne (FR); Christelle Debrauwer, Saint Germain sur Morin (FR); Claire Evrard, Saint Mande (FR); Wing Yam Liu, Montevrain (FR)

(73) Assignee: SOCIETE BIC, Clichy (FR)

(*) Notice: Subject to any disclaimer, the term of this patent is extended or adjusted under 35 U.S.C. 154(b) by 722 days.

(21) Appl. No.: 16/956,038

(22) PCT Filed: Dec. 19, 2018

(86) PCT No.: PCT/EP2018/085993
§ 371 (c)(1),
(2) Date: Jun. 19, 2020

(87) PCT Pub. No.: WO2019/122017
PCT Pub. Date: Jun. 27, 2019

(65) Prior Publication Data
US 2021/0108099 A1    Apr. 15, 2021

(30) Foreign Application Priority Data

Dec. 21, 2017 (EP) .................. 17306876

(51) Int. Cl.
| C09D 11/18 | (2006.01) |
| C08K 3/36 | (2006.01) |
| C08K 5/05 | (2006.01) |
| C08K 5/20 | (2006.01) |
| C08K 5/00 | (2006.01) |

(52) U.S. Cl.
CPC .............. C09D 11/18 (2013.01); C08K 3/36 (2013.01); C08K 5/0041 (2013.01); C08K 5/05 (2013.01); C08K 5/20 (2013.01)

(58) Field of Classification Search
CPC ........ C09D 11/18; C08K 3/36; C08K 5/0041; C08K 5/05; C08K 5/20
USPC ....................................... 106/31.27
See application file for complete search history.

(56) References Cited

FOREIGN PATENT DOCUMENTS

| EP | 1101804 | 5/2001 | |
| EP | 1101804 A1 * | 5/2001 | ............. C09D 11/18 |
| EP | 1101805 | 5/2001 | |
| JP | 07196972 | 8/1995 | |
| JP | 3078172 | 8/2000 | |
| JP | 2004338134 A * | 12/2004 | |
| JP | 4726311 B * | 7/2011 | |
| JP | 2013121992 A * | 6/2013 | |
| JP | 2016017105 | 2/2016 | |
| JP | 2016117828 | 6/2016 | |
| WO | 2010052729 | 5/2010 | |

OTHER PUBLICATIONS

International Preliminary Report on Patentability dated Jul. 2, 2020 in corresponding International PCT Patent Application PCT/EP2018/085993, 6 pages.
International Search Report dated Mar. 18, 2019 in corresponding International PCT Patent Application PCT/EP2018/085993, 3 pages.

* cited by examiner

*Primary Examiner* — Kelechi C Egwim
(74) *Attorney, Agent, or Firm* — Ruggiero, McAllister & McMahon LLC

(57) ABSTRACT

The present disclosure concerns non-aqueous gel writing ink including a solvent, a coloring agent and a gelling agent, in which the gelling agent is a mixture of silica particles and of a fatty acid amide wax. It also concerns the process of preparation of the non-aqueous gel writing ink and the use of a mixture of silica particles and of a fatty acid amide wax, as a gelling agent in a non-aqueous gel writing ink. It finally concerns a writing instrument containing the ink according to the present disclosure.

17 Claims, No Drawings

WRITING GEL INK

CROSS REFERENCE TO RELATED APPLICATION(S)

This application is a National Stage Application of International Application No. PCT/EP2018/085993, filed on Dec. 19, 2018, now published as WO2019/122017A1 and which claims priority to European Application EP17306876.8 filed on Dec. 21, 2017, the entire of which is incorporated by reference.

TECHNICAL FIELD

The present disclosure concerns the writing ink area, in particular ink for pen.

PRIOR ART

Conventionally, ball pen inks are Newtonian high viscosity solvent based ink. Due to the use of heavy glycols solvents, ball pen inks are very stable during storage since the ink doesn't dry. Therefore the ink can be used in pens without point protection. Ball pen viscosity was defined at ~15 000 mPa·s at 20° C. to avoid static leakage (static leakage corresponds to the ink drop formation on the point when the pen is stored point down, especially in hot and humid condition).

With such a high shear viscosity, writing experience is not as smooth as the consumer would want:

To improve the smoothness, formulator can decrease the viscosity. However in this case, rest viscosity becomes too low and static leakage dramatically increases.

Ball pen inks being Newtonian, rest viscosity is the same as shear viscosity. The rest viscosity remaining relatively low (15 000 mPa·s at 20° C.), this prohibits the addition of pigments or other particles (due to low rest viscosity, these particles would settle in pen points and clog them).

Therefore, in order to solve these problems, the formulator turned to gel ink. Gel inks have a pseudoplastic rheological profile. In general gel inks are water based. They are a perfect compromise between low static leakage, smoothness and particles stabilization. However they suffer from several drawbacks:

Water is a light and volatile solvent. When stored without point protection (cap or hotmelt), ink in the point can dry then clog the point; cap off time of gel inks is much lower as cap off time of solvent based ball pens.

Despite the use of corrosion inhibitors, water based inks remains corrosive fluids. It is therefore impossible to use brass points and it is mandatory to use stainless steel points which are quite expensive materials and difficult to manufacture (hard material).

Water being a bad lubricant, it is also mandatory to use points with strong flow (~300 mg/200 m for water based inks tips versus ~35 mg/200 m for solvent based inks tips). As a result, mileage (total length of writing of the pen) of aqueous inks is much lower than mileage of solvent inks pens.

Today, some hybrid inks exist: it consists in thickened water emulsified in a solvent based ball pen ink. This solution allows bringing smoothness but present 3 mains problems:

Poor ageing: difficult to formulate a stable emulsion and risk of losing water during ageing. If it occurs, gelling agent will precipitate due to the lack of water and the precipitate will clog points.

It doesn't solve the problem of point corrosion. Due to water presence, it is still mandatory to use stainless steel points.

Color is weaker than in ball point pen inks due to the inclusion of water droplets inside the ink.

Solvent gel inks have also been described in the prior art. In particular JP3078172 and JPH07-196972 describe the use of fatty acid amide wax in an oily ink composition as a thixotropic agent for imparting thixotropy to the ink such as the compounds Talen 600 from KYOEISHA CHEMICAL and DISPARLON 6500 from Kusumoto Chemicals.

However the fatty amid waxes alone are not sufficient to avoid the static leakage of the ink.

SUMMARY

Surprisingly the inventors have discovered this technical problem can be solved if a combination of fatty acid amide wax and silica particles are used as the gelling agent whereas it is not the case if bentonite clay is used instead of silica particles.

Therefore, the present disclosure concerns a non-aqueous gel writing ink comprising a solvent, a coloring agent and a gelling agent, wherein the gelling agent is a mixture of silica particles and of a fatty acid amide wax, advantageously of hydrophilic silica particles and of a fatty acid amide wax.

For the purposes of the present disclosure, the term "writing ink" is intended to mean any ink which is intended to be used in a writing instrument, in particular in a pen such as a ball-pen. A writing ink should not be confused with a printing ink which is used in printing machines and which does not have the same technical constraints and thus the same specifications. Indeed, a writing ink must not contain solid particles of which the size is greater than the channels of the writing instrument, in order to avoid blocking them, which would inevitably lead to writing being irreversibly stopped. In addition, it must allow an ink flow rate suitable for the writing instrument used, in particular a flow rate of between 10 and 300 mg/200 m of writing, advantageously between 30 and 60 mg/150 m of writing, more advantageously of 50 mg/150 m. It must also dry sufficiently rapidly to avoid smudging the writing medium. It must also avoid the problems of migration (bleeding) over time. Thus, the ink according to the present disclosure will be suitable for the writing instrument for which it is intended, in particular for a pen such as a ball-pen.

In addition, a writing ink must not be too fluid, so as to avoid leaks during writing. However, it must be sufficiently fluid to facilitate the flow of the writing action.

In the particular case, the writing ink being a "gel ink" (which corresponds therefore to a thixotropic ink), the viscosity measured at rest (at a shear rate of $0.01\ s^{-1}$) at 20° C. is different and in particular higher than the viscosity measured with a shear rate of $100\ s^{-1}$ at 20° C. using the same rheometer such as a cone-and-plate rheometer for example Malvern KINEXUS with a cone of 40 mm and an angle of 4°.

In a particular embodiment, the viscosity of the gel ink according to the present disclosure measured at 20° C. with a cone-and-plate rheometer for example Malvern KINEXUS with a cone of 40 mm and an angle of 4° is of between 20 000 and 100 000 mPa·s, advantageously between 40 000 and 90 000 mPa·s, more advantageously between 50 000 and 80 000 mPa·s, with a shear rate of $0.01\ s^{-1}$ and advantageously between 1500 and 15 000 mPa·s, more advantageously between 1800 and 3 000 mPa·s, still more advantageously of 2000 mPa·s with a shear rate of $100\ s^{-1}$.

Advantageously, such a viscosity is stable during storage for at least three months at 40° C. and 80% relative humidity, in particular the viscosity will not have a more than 50% decrease.

More advantageously, the return to viscosity at rest after shear is very quick, advantageously at most a few minutes, in order to avoid the static leakage in the minutes after writing.

The ink according to the present disclosure is a "non-aqueous ink". The term "non-aqueous ink" is intended to mean in the context of the present disclosure a water-free ink, i.e. any ink which does not contain any aqueous solvent and advantageously which does not contain any water, even in a small proportion. This is because the gelling agent contained therein makes the use of aqueous solvent needless in order to obtain a gel.

However, the ink according to the present disclosure contains a solvent (which is not an aqueous solvent), in particular chosen in the group consisting of glycol ether, alcohol, and mixture thereof. In an advantageous embodiment, the alcohol is a high boiling point alcohol, advantageously chosen in the group consisting of benzyl alcohol, ethylene glycol, diethylene glycol, propylene glycol, dipropylene glycol, trimethylene glycol, glycerin and mixture thereof, more advantageously the alcohol is benzyl alcohol. In another advantageous embodiment the glycol ether is chosen in the group consisting of diethylene glycol monoethyl ether, diethylene-glycol-mono butyl ether, dipropyleneglycol monobutyl ether, tripropylene glycol monomethyl ether, phenoxyethanol, phenoxypropanol and mixture thereof, advantageously chosen in the group consisting of phenoxyethanol, phenoxypropanol and mixture thereof.

In a further advantageous embodiment the solvent is phenoxyethanol. Advantageously, the solvent content of the ink according to the present disclosure is between 35 and 80% by weight, relative to the total weight of the ink, more advantageously between 45 and 75% by weight, relative to the total weight of the ink, still more advantageously between 50 and 70% by weight, relative to the total weight of the ink.

The ink according to the present disclosure also contains a coloring agent in order to impart color to the ink according to the present disclosure.

The coloring agent can be a pigment or a dye or a mixture thereof, in particular conventional dyes or pigments employed in non-aqueous ball point pens.

Advantageously it is a dye. In this case the ink is a dye-based ink. It thus comprises at least one dye. It may also comprise several thereof. The dyes usable in the ink according to the disclosure may be any dyes known by the one skilled in the art, such as black, blue, red, green, violet, pink, turquoise, etc. dyes. In particular, the dyes usable in the ink according to the present disclosure are alcohol-soluble dyes, oil-soluble dyes, direct dyes, acid dyes, basic dyes, metallized dyes and various salt-forming type dyes, more particularly the dyes are chosen in the group consisting of azoic dyes, triarylmethane dyes, phtalocyanine derivatives dyes, xanthene dyes and mixture thereof.

Azoic dyes contain an azoic skeleton having the formula below:

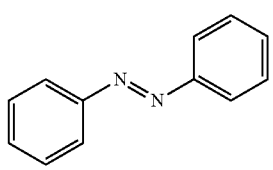 [SMILES: c1ccc(/N=N/c2ccccc2)cc1]

Triarylmethane dyes contain a tryarylmethane skeleton having the formula below:

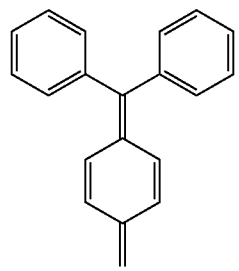 [SMILES: C=c1ccc(=C(c2ccccc2)c2ccccc2)cc1]

Phtalocyanine derivatives dyes contain a phtalocyanine skeleton having the formula below:

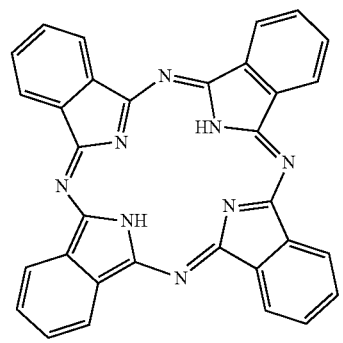 [SMILES: c1ccc2c(c1)-c1nc-2nc2[nH]c(nc3nc(nc4[nH]c(n1)c1ccccc41)-c1ccccc1-3)c1ccccc21]

Xanthene dyes contain a xanthene skeleton having the formula below:

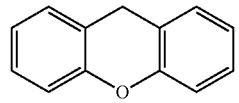 [SMILES: c1ccc2c(c1)Cc1ccccc1O2]

Examples of a solvent dye usable in the ink according to the present disclosure are as follow: VARIFAST Black 3806 (C.I. Solvent Black 29), 3807 (trimethylbenzylammonium salt of C.I. Solvent Black 29), Spirit Black SB (C.I. Solvent Black 5), SPIRON Black GMH (C.I. Solvent Black 43), Solvent Black 46, VARIFAST Red 1308 (salt forming form of C.I. Basic Red 1 dye and C.I. Acid Yellow 23 dye), Solvent Red 49, VARIFAST Yellow AUM (salt forming form of C.I. Basic Yellow 2 dye and C.I. Acid Yellow 42 dye), SPIRON Yellow C2 GH (organic acid salt of C.I. Basic Yellow 2), SPIRON Violet CRH (C.I. Solvent Violet 8-1), VARIFAST Violet 1701 (salt forming form of C.I. Basic Violet 1 and C.I. Acid Yellow 42 dye), SPIRON Red CGH (organic acid salt of C.I. Basic Red 1), SPIRON Pink BH (C.I. Solvent Red 82), Nigrosine Base EX (C.I. Solvent Black 7), Oil Blue 613 (C.I. Solvent Blue 5), Neozapon Blue 808 (C.I. Solvent Blue 70), In another embodiment, the coloring agent is a pigment known by the one skilled in the art. Examples of the pigment include organic, inorganic and processed pigments. Thus the pigment may for example be an inorganic pigment such as a carbon black, ultramarine and titanium dioxide pigment, an organic pigment such as an azo-based pigment, phthalocyanine-based pigment, indigo pigment, thioindigo pigment, thren pigment, quinacridone-based pigment, anthraquinone-based pigment, thron-based pigment, diketopyrrolopyrrole-based pigment, dioxazine-based pigment, perylene-based pigment, perinone-based pigment and isoindolinone-based pigment, a metal pigment such as an aluminum powder or aluminum powder whose surface is treated with a colored resin, a metal gloss pigment obtained by forming a metal vapor deposition film such as that of aluminum on a transparent or colored transparent film, a metal pigment having a thickness of 0.01 to 0.1 μm obtained by peeling a metal vapor deposition film such as that of aluminum formed on a substrate such as a film, a colloidal particle having a mean particle size of 5 to 30 nm selected from gold, silver, platinum and copper, a fluorescent pigment, light-storing pigment, pearl pigment obtained by coating the surface of a core which is a naturally occurring mica, synthetic mica, glass flake, alumina and transparent film with a metal oxide such as titanium oxide, and the like. Advantageously, the coloring agent content of the ink according to the present disclosure is between 5 and 30% by weight relative to the total weight of the ink, more advantageously between 7 and 28% by weight relative to the total weight of the ink.

The ink according to the present disclosure also comprises a gelling agent, wherein the gelling agent is a mixture of silica particles and of a fatty acid amide wax.

In an advantageous embodiment, silica particles are hydrophilic silica particles, in particular hydrophilic fumed silica particles, such as the product sold by Evonik under the trade name AEROSIL® 200.

In another advantageous embodiment, the fatty acid amide wax is a fatty acid polyamide wax, advantageously a fatty acid diamide wax, in particular chosen in the group consisting of Methylenebis stearic acid amide, N,N'-Ethylenebis(capronamide) of the following formula $CH_3(CH_2)_4CONH(CH_2)_2NHCO(CH_2)_4CH_3$, ethylenebis capric acid amide (or N,N'-Ethylenebis(caprinamide)) of the following formula $CH_3(CH_2)_8CONH(CH_2)_2NHCO(CH_2)_8CH_3$, Ethylenebis lauric acid amide, ethylenebis stearic acid amide, Ethylenebis hydroxystearic acid amide, ethylenebis behenic acid amide, Hexa methylenebis stearic acid amide, hexa methylenebis behenic acid amide, N,N'-distearyl adipic acid amide, N,N'-ethylenebis 12-hydroxystearic acid amide of the following formula $CH_3(CH_2)_5CHOH(CH_2)_{10}CONH(CH_2)_2NHCO(CH_2)_{10}CHOH(CH_2)_5CH_3$, octadecanamide of the following formula

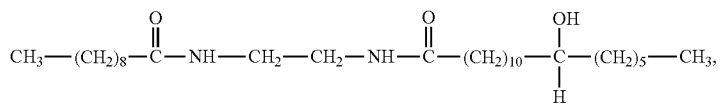

12-hydroxy-N-[2-[(1-oxyhexyl)amino]ethyl]octadecanamide of the following formula $CH_3(CH_2)_4CONH(CH_2)_2NHCO(CH_2)_{10}CHOH(CH_2)_5CH_3$, N,N'-ethane-1,2-diylbis(12-hydroxy octadecanamide) of the following formula $CH_3(CH_2)_5CHOH(CH_2)_{10}CONH(CH_2)_2NHCO(CH_2)_{10}CHOH(CH_2)_5CH_3$) and mixture thereof.

Therefore advantageously the fatty acid part of the fatty acid amide wax is chosen in the group consisting of caprylic acid, capric acid, lauric acid, myristic acid, palmitic acid, stearic acid, hydroxystearic acid, arachidic acid behenic acid and mixture thereof.

More advantageously, the fatty acid amide wax is chosen in the group consisting of N,N'-Ethylenebis(capronamide) of the following formula $CH_3(CH_2)_4CONH(CH_2)_2NHCO(CH_2)_4CH_3$, ethylenebis capric acid amide (or N,N'-Ethylenebis(caprinamide)) of the following formula $CH_3(CH_2)_8CONH(CH_2)_2NHCO(CH_2)_8CH_3$, N,N'-ethylenebis 12-hydroxystearic acid amide of the following formula $CH_3(CH_2)_5CHOH(CH_2)_{10}CONH(CH_2)_2NHCO(CH_2)_{10}CHOH(CH_2)_5CH_3$, octadecanamide of the following formula

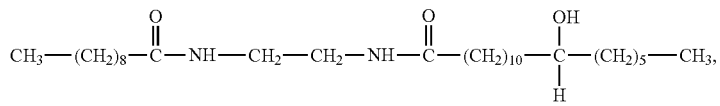

12-hydroxy-N-[2-[(1-oxyhexyl)amino]ethyl]octadecanamide of the following formula $CH_3(CH_2)_4CONH(CH_2)_2NHCO(CH_2)_{10}CHOH(CH_2)_5CH_3$, N,N'-ethane-1,2-diylbis(12-hydroxy octadecanamide) of the following formula $CH_3(CH_2)_5CHOH(CH_2)_{10}CONH(CH_2)_2NHCO(CH_2)_{10}CHOH(CH_2)_5CH_3$) and mixture thereof.

Still more advantageously, the fatty acid amide wax is chosen in the group consisting of octadecanamide of the following formula

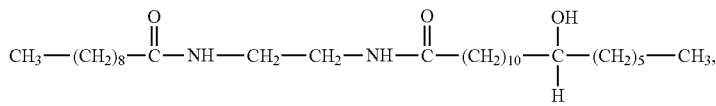

N,N'-Ethylene-bis-12-hydroxystearamide of the following formula $CH_3(CH_2)_5CHOH(CH_2)_{10}CONH(CH_2)_2NHCO(CH_2)_{10}CHOH(CH_2)_5CH_3$, N,N'-Ethylenebis(caprinamide) of the following formula $CH_3(CH_2)_8CONH(CH_2)_2NHCO(CH_2)_8CH_3$ and mixture thereof.

In a particular embodiment, the fatty acid amide wax comprises octadecanamide of the following formula

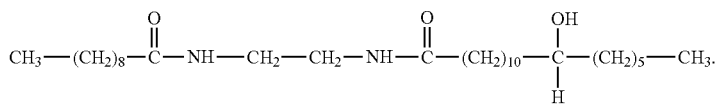

More particularly, the fatty acid amide wax is a mixture of the three following fatty acid amide waxes:

octadecanamide of the following formula

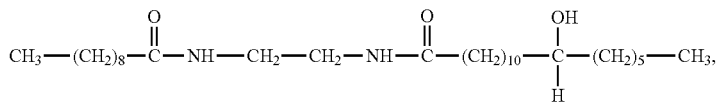

N,N'-Ethylene-bis-12-hydroxystearamide of the following formula $CH_3(CH_2)_5CHOH(CH_2)_{10}CONH(CH_2)_2NHCO(CH_2)_{10}CHOH(CH_2)_5CH_3$ and N,N'-Ethylenebis(caprinamide) of the following formula $CH_3(CH_2)_8CONH(CH_2)_2NHCO(CH_2)_8CH_3$.

Still more particularly, the fatty acid amide wax is a mixture of three fatty acid amide waxes obtained by the reaction between ethylene diamine, decanoic acid and 12-hydroxystearic acid.

Still more advantageously the fatty acid amide wax has a melting point in the range 120° C.-130° C. The fatty acid amide wax according to the present disclosure is available on the market under the trade name Thixatrol® MAX from Elementis, CRAYVALLAC SUPER® from Arkema, Disparlon® 6500 from Kusumoto Chemicals and LUVOTIX® SAB from Lehmann & Voss & Co.

The inventors have discovered that the fatty acid amide wax octadecanamide alone or in admixture with N,N'-Ethylene-bis-12-hydroxystearamide and N,N'-Ethylenebis(caprinamide) is particularly useful for providing a strong gelling network whatever the type of dyes used in the ink composition such as azoic dyes, triarylmethane dyes, phtalocyanine derivatives dyes, xanthene dyes and mixture thereof.

Indeed the fatty acid amide wax creates a network with the solvent by creating hydrogen bonds without the need of water. In case the ink is a dye-based ink, this network is strengthened by hydrogen interactions with dyes.

When the gelling agent comprises octadecanamide according to the present disclosure, the network obtained with the solvent is strong enough to obtain a gelled ink, whatever the type of coloring agent and in particular the type of dye used.

In an advantageous embodiment, the gelling agent content of the ink according to the present disclosure is in the range 0.1-1.2%, more advantageously in the range 0.15-0.60%, by weight, relative to the total weight of the ink.

In an advantageous embodiment, the fatty acid amid wax content of the ink according to the present disclosure is in the range 0.1-0.6% by weight, relative to the total weight of the ink, more advantageously in the range 0.3-0.6%.

In another advantageous embodiment, the silica particles content of the ink according to the present disclosure is in the range 0.05-0.8% by weight, relative to the total weight of the ink, more advantageously in the range 0.1-0.5%.

The ink according to the present disclosure may also comprise an additive. This additive is generally a conventional additive of writing inks and is in particular chosen in the group consisting of clear drain agents, viscosity imparting agent, lubricant, dispersing agent and mixture thereof. The ink according to the disclosure may contain (by weight relative to the total weight of the ink) between 0 and 20% of the additive, advantageously between 5 and 19%, more advantageously between 10 and 17%.

The viscosity imparting agent can be a resin which may be natural or synthetic. The resin can be a vinyl resin (such as a vinyl chloride copolymer, polyvinyl butyrale, polyvinylpyrrolidone, a polyvinyl acetate, a vinyl-pyrrolidone and vinyl acetate copolymer, a polyvinyl alcohol resin or a mixture thereof), an acrylic resin, a styrene-acrylic resin, a styrene-maleic acid copolymer resin, a rosin-maleic acid copolymer resin, a phenol resin, a cellulosic resin, a ketone resin, a ketone-formaldehyde resin (such as an acetophenone-formaldehyde modified resin), an amid resin, an alkyd resin, a rosin modified resin, a rosin modified phenol resin, a xylene resin, a polyacetal resin, a terpene resin, a phenoxy resin or a mixture thereof. The ink according to the disclosure may contain (by weight relative to the total weight of the ink) between 0 and 40% of the viscosity imparting agent, advantageously between 5 and 35%, more advantageously between 7 and 30%.

The clear drain agents can be for example sorbitan sesquioleate in particular sold under the trade name Lonzest® SOC.

The ink according to the disclosure may contain (by weight relative to the total weight of the ink) between 0 and 5% of the clear drain agent, advantageously between 0.5 and 2%, more advantageously between 1 and 1.5%.

The dispersing agent is particularly useful when the coloring agent is a pigment and can be Tego®Dispers 670, Tego® Dispers 671, Tego®Dispers 672, Tego®Dispers 685, Tego®Dispers 688, Tego®Dispers 690, Tego®Dispers 710 by Evonik. The ink according to the disclosure may contain (by weight relative to the total weight of the ink) between 2 and 20% of the dispersing agent, advantageously between 5 and 15%. In a particular embodiment, the ink according to the present disclosure does not contain any bentonite clay.

The present disclosure also concerns the process of preparation of the non-aqueous gel writing ink according to the present disclosure.

In a particular embodiment, the fatty acid amide wax is activated by formation of a premix in a solvent, advantageously the solvent as described above for the ink, in particular glycol ether, more advantageously phenoxyethanol, before its addition in the writing ink containing the solvent and the coloring agent, the silica particles and optionally the additive. Indeed such activation allows the spreading of the polymer chains of the fatty acid amide wax and therefore the obtaining of a stronger gel network.

Advantageously the activation step (formation of a premix) is carried out at a precise temperature and shear stress. Therefore advantageously, the activation step (formation of a premix) is carried out at a temperature of between 30 and 70° C., more advantageously between 40 and 60° C., still more advantageously at 60° C., with a shear rate of between 20 and 25 m/s.

In order to obtain such a premix, a rotor-stator disperser can be used. The perfect activation is physically visible by measuring viscosity at rest of the premix. When activation is complete, viscosity at rest is maximal (spreading polyamide wax chains increases the rest viscosity, destroying the chains decreases the rest viscosity).

Advantageously, the viscosity measured at 20° C. with a cone-and-plate rheometer, such as the Malvern KINEXUS rheometer with a cone of 40 mm and an angle of 4°, of the premix obtained is more than two million mPa·s at a shear rate of 0.01 $s^{-1}$; the premix obtained is between 500 and 1500 mPa·s at a shear rate of 100 $s^{-1}$ preferably between 800 and 1300 mPa·s at a shear rate of 100 $s^{-1}$; the premix obtained is between 100 and 400 mPa·s at a shear rate of 1000 $s^{-1}$, preferably between 200 and 350 mPa·s at a shear rate of 1000 $s^{-1}$.

In another particular embodiment of the process according to the present disclosure, the addition of the fatty acid amide wax, in particular in the form of a premix, to the writing ink already containing the solvent, the silica particles and the coloring agent, in particular the dyes, is carried out at a precise temperature, advantageously of between 50 and 60° C. Indeed, with the same amount of premix, higher loading temperature brings to higher rest viscosity and higher stable rest viscosity after three months of storage. This is due to a second activation of the fatty acid amide wax with the dyes.

This temperature has also an inverse impact on the viscosity return after writing. The lower the temperature, the quicker is the return to rest viscosity after writing. If the return to rest temperature is too long, static leakage can occur in the few minutes after writing and in case the coloring agent is a pigment, pigments settlement could start. It is preferable for the static leakage to be <1.0 mm.

Therefore it is preferable to choose the best compromise in term of addition temperature, which is advantageously of between 50 and 60° C.

The present disclosure also concerns the use of a mixture of silica particles and of a fatty acid amide wax as a gelling agent in a non-aqueous gel writing ink.

Finally the present disclosure concerns a writing instrument, in particular a pen such as a ball-pen, containing the ink according to the present disclosure.

The present disclosure will be understood more clearly in the light of the examples which follows, which are given by way of non-limiting indication.

In the Examples, the viscosity is measured at 20° C. using a cone-and-plate rheometer Malvern KINEXUS with a cone of 40 mm and an angle of 4°.

EXAMPLE 1: INK COMPOSITION ACCORDING TO THE PRESENT DISCLOSURE

Table 1 below contains the composition of an ink according to the present disclosure.

TABLE 1

| Trade name | Chemical name | Function | Content in wt. % |
|---|---|---|---|
| Phenoxyethanol(EPH) | Phenoxyethanol | solvent | 52.3 |
| Aerosil 200 ® | Fumed silica | GELING agent | 0.4 |
| Solvent Black 46 ® | Solvent black 46 | dye | 25 |
| Lonzest SOC ® | Sorbitan Sesquioleate | Clear drain agent | 1.3 |
| Ketonic Resin | Resin | Viscosity agent | 13.5 |
| CRAYVALLAC SUPER ® | fatty acid amide wax at 5% in phenoxyethanol | GELING AGENT | 7.5 |
| Total | | | 100 |

The viscosity of the ink is as follow:
50 0000 mPa·s at 20° C. with a shear rate of 0.01 $s^{-1}$
2000 mPa·s at 20° C. with a shear rate of 100 $s^{-1}$ The ink has been prepared by first activating the fatty acid amide wax (CRAYVALLAC SUPER®) by preparing a premix as follow:
Addition of 5% by weight of CRAYVALLAC SUPER® in phenoxyethanol at a temperature of 60° C. by using a stator/rotor disperser with a shear rate of between 20 and 25 m/s.

This process allows the activation of CRAYVALLAC SUPER® in order for it to adequately play its gelling agent function.

The premix has the following viscosity at 20° C.:
more than 2 million mPa·s at a shear rate of 0.01 $s^{-1}$,
about 1100 mPa·s at a shear rate of 100 $s^{-1}$ and
about 230 mPa·s at a shear rate of 1000 $s^{-1}$.

To obtain this premix, the dispersion time is 50 minutes by using a stator/rotor disperser with a shear rate of between 20 and 25 m/s.

Contacting the premix with the ink formulation is carried out at a temperature of between 50 and 60° C. in order to obtain the best compromise between the immediate return to the rest viscosity after writing and storage for three months at 40° C. and 80% relative humidity.

EXAMPLE 2: COMPARISON BETWEEN THE GELLING AGENT ACCORDING TO THE DISCLOSURE AND OTHER GELLING AGENTS

The viscosity at rest (0.01 $s^{-1}$/20° C.) of the mixture of solvent+dye has been compared with the viscosity of the same mixture+0.5% gelling agent. 3 gelling agents have been compared:

CRAYVALLAC SUPER® containing octadecanamide (the fatty acid amide wax according to the present disclosure) which has been activated by preparing a premix as indicated in example 1;

Thixatrol MAX® from Elementis (which is a mixture of N,N'-ethane-1,2-diylbis(hexanamide) (or N,N'-Ethylenebis(capronamide)), 12-hydroxy-N-[2-[(1-oxyhexyl)amino]ethyl]octadecanamide and N,N'-ethane-1,2-diylbis(12-hydroxy octadecanamide) having the respective following formula: $CH_3(CH_2)_4CONH(CH_2)_2NHCO(CH_2)_4CH_3$ $CH_3(CH_2)_4CONH(CH_2)_2NHCO(CH_2)_{10}CHOH(CH_2)_5CH_3$ and $CH_3(CH_2)_5CHOH(CH_2)_{10}CONH(CH_2)_2NHCO(CH_2)_{10}CHOH(CH_2)_5CH_3$) (another fatty acid amide wax according to the disclosure). It has been activated by preparing a premix as follow: addition of 3% by weight of Thixatrol MAX® in phenoxyethanol at a temperature of 50° C. by using a stator/rotor disperser with a shear rate of between 20 and 25 m/s.

CRAYVALLAC MT® from ARKEMA which is a castor oil modified polyamide (comparative gelling agent). It has been activated by preparing a premix as follow: addition of 2.8% by weight of CRAYVALLAC MT® in phenoxypropanol at a temperature of 60° C. by using a stator/rotor disperser with a shear rate of between 20 and 25 m/s.

The results are given in the following Table 2:

TABLE 2

| Ink color | Rest viscosity (0.01 $s^{-1}$/20° C.) | | | | |
|---|---|---|---|---|---|
| | Black | Blue | Red | Green | Pink |
| Mix of dyes | Triarylmethane + Azoic | Triarylmethane + Phtalocyanine | Xanthene + Azoic | Phtalocyanine + Azoic | Xanthene |
| Viscosity of solvent + dyes solution | 2500 mPa · s | 2200 mPa · s | 6270 mPa · s | 4200 mPa · s | 1200 mPa · s |
| Increase of rest viscosity with 0.5% CRAYVALLAC MT® | + | − | + | − | +++ |
| Increase of rest viscosity with 0.5% THIXATROL MAX® | ++ | ++ | ++ | + | +++ |
| Increase of rest viscosity with 0.5% CRAYVALLAC SUPER® | +++ | +++ | +++ | +++ | +++ |

−: no viscosity change
+: +1000 to + 5000% rest viscosity
++: +5000 to + 10 000% rest viscosity
+++: >+10 000% rest viscosity
Crayvallac MT ® allows creating a good network only with pink ink and creates a poor network with black & red inks and no network at all with blue and green inks.

Therefore it cannot be used as a gelling agent according to the present disclosure.

Thixatrol MAX® and Crayvallac Super® provide a good gelling network, the strength of the gelling network being better with Crayvallac Super®, whatever the type of dye used.

The initial viscosity at rest (0.01 $s^{-1}$/20° C.), the shear viscosity at 100 $s^{-1}$ and the immediate rest return (0.01 $s^{-1}$) at 20° C. of the ink composition according to example 1 have been compared with the viscosity of the same ink composition in which the gelling agent (mixture of fatty acid amide wax+silica particles) has been replaced by 0.7% by weight of silica particle (Aerosil® 200) (comparative example 1) or by 0.4% by weight of silica particle (Aerosil® 200)+0.3% by weight of bentonite clay (Bentone SD-2) (comparative example 2).

In the preparation of the comparative example 1, 0.3% of the silica particles are added in the form of a 10% premix in phenoxyethanol at 20° C. in the ink composition containing the other ingredients and the rest of the silica particles.

In the preparation of the comparative example 2, the bentonite clay is added in the form of a 5% premix in phenoxyethanol at 60° C. in the ink composition containing the other ingredients. The results are given in the following Table 3:

TABLE 3

| type of gelling agent | Initial rest viscosity (0.01 $s^{-1}$) at 20° C. | Shear viscosity (100 $s^{-1}$) at 20° C. | Immediate rest return (0.01 $s^{-1}$) at 20° C. |
|---|---|---|---|
| Example 1 | 53 000 | 2100 | 8000 |
| Comparative Example 1 | 2600 | 2300 | 2330 |
| Comparative Example 2 | 2270 | 2100 | 2020 |

As can be seen in this table, silica alone and a mixture of silica and clay do not impart a sufficient viscosity at rest to the ink composition in order to form a gel writing ink.

The static leakage of the ink according to example 1 has been compared with an ink composition with the static leakage of the same ink composition in which fatty acid amide wax is used as the only gelling agent (no silica particles are present in the ink composition) (Comparative example 3) or in which the fatty acid amide wax is used in combination with 0.4% by weight of bentonite clay (Bentone SD-2) (Comparative example 4). For this test, the experimental protocol is as follow:

Writing system: retractable cartridge with needle tip of 0.7 mm and a BIC Atlantis body.

The static leakage is measured by taking the drop formed at the tip of the pen on a paper sheet. The drop is then covered by a transparent adhesive tape and then circularly spread with a wallpaper roller. The obtained stain diameter is then measured.

The static leakage at 40° C./80% corresponds to the spread diameter of the drop formed after storage of the pen with the tip down during a week in a climatic chamber at 40° C. and 80% relative humidity.

The static leakage at 23° C./50% corresponds to the spread diameter of the drop formed after storage of the pen with the tip down during 24 hours in a climatic chamber at 23° C. and 50% relative humidity.

An excellent seepage corresponds to the case where the spread diameter of the drop is below 1.5 mm.

The results are given in the following Table 4:

TABLE 4

| type of gelling agent | Static leakage at 40° C./80% | Static leakage at 23° C./50% |
|---|---|---|
| Example 1 | 1.0 mm | 1.1 mm |
| Comparative Example 3 | 10.5 mm | 3.5 mm |
| Comparative Example 3 | 3.9 mm | 3.3 mm |

As shown in this table, if fatty acid amide wax is used alone as the gelling agent or in combination with bentonite clay, the static leakage is not acceptable. Therefore the presence of silica particles is necessary in order to avoid this problem and could not be replaced by bentonite clay.

EXAMPLE 3: COMPARISON BETWEEN THE DIFFERENT TEMPERATURES OF ADDITION OF THE PREMIX OF THE FATTY ACID AMIDE WAX ACCORDING TO THE DISCLOSURE IN THE INK COMPOSITION ACCORDING TO EXAMPLE 1

A premix of the fatty acid amide wax has been prepared as follow:

Addition of 5% by weight of the fatty acid amide wax in phenoxyethanol at a temperature of 60° C. by using a stator/rotor disperser with a shear rate of between 20 and 25 m/s.

This process allows the activation of the fatty acid amide wax in order for it to adequately play its gelling agent function.

The premix has the following viscosity at 20° C.:

more than 2 million mPa·s at a shear rate of 0.01 s$^{-1}$, about 1100 mPa·s at a shear rate of 100 s$^{-1}$ and about 230 mPa·s at a shear rate of 1000 s$^{-1}$.

To reach the rest viscosity measured at 20° C. of 50 0000 mPa·s at 0.01 s$^{-1}$, the quantity of premix added to the ink composition according to example 1 depends on the temperature at which it is added to the ink.

The results are indicated in the following Table 5:

TABLE 5

| Temperature of addition of the premix in the ink | Quantity of premix needed to reach viscosity of 50 000 mPa · s at rest (0.01 s$^{-1}$) at 20° C. |
|---|---|
| 30° C. | 15% |
| 40° C. | 7% |
| 50° C. | 6% |
| 60° C. | 4% |

With a same amount of premix, higher loading temperature brings higher rest viscosity. This is due to a second activation of the fatty acid amide wax with dyes.

Rest viscosity return after writing and storage stability was also analyzed. The results are indicated in the following Table 6.

TABLE 6

| Premix addition temperature (° C.) | Initial rest viscosity (0.01 s$^{-1}$) at 20° C. | Shear viscosity (100 s$^{-1}$) at 20° C. | Immediate rest return (0.01 s$^{-1}$) at 20° C. | Rest viscosity after 1 month storage at 20° C. and 50% RH (Temperate climate) | Rest viscosity after 1 month storage at 40° C. and 80% RH (Tropical climate) |
|---|---|---|---|---|---|
| 30° C. | 50 000 mPa · s | 2500 mPa · s | 65 000 mPa · s | 108 000 mPa · s | 106 000 mPa · s |
| 40° C. | | | 10 000 mPa · s | 50 000 mPa · s | 70 000 mPa · s |
| 50° C. | | | 8 000 mPa · s | 50 000 mPa · s | 30 000 mPa · s |
| 60° C. | | | 8000 mPa · s | 40 000 mPa · s | 25 000 mPa · s |

The best compromise is therefore using a temperature of between 50° C. and 60° C. for the addition of the premix in the ink composition according to the present disclosure.

The invention claimed is:

1. A non-aqueous gel writing ink comprising a solvent, a coloring agent and a gelling agent, wherein the gelling agent comprises a mixture of silica particles and of a fatty acid amide wax, and wherein the fatty acid amide wax includes octadecanamide of the following formula:

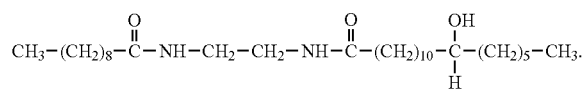

2. A non-aqueous gel writing ink according to claim 1, wherein the fatty acid amide wax further
N,N'-Ethylene-bis-12-hydroxystearamide of the following formula $CH_3(CH_2)_5CHOH(CH_2)_{10}CONH(CH_2)_2NHCO(CH_2)_{10}CHOH(CH_2)_5CH_3$ and
N,N'-Ethylenebis(caprinamide) of the following formula $CH_3(CH_2)_8CONH(CH_2)_2NHCO(CH_2)_8CH_3$.

3. A non-aqueous gel writing ink according to claim 1, wherein the gelling agent content is in the range 0.1-1.2%, by weight, relative to the total weight of the ink.

4. A non-aqueous gel writing ink according to claim 1, wherein the solvent is chosen in the group consisting of glycol ether, alcohol, and mixture thereof.

5. A non-aqueous gel writing ink according to claim 1, wherein the solvent content is between 35 and 80% by weight, relative to the total weight of the ink.

6. A non-aqueous gel writing ink according to claim 1, wherein the coloring agent is a dye.

7. A non-aqueous gel writing ink according to claim 1, wherein the coloring agent content is between 5 and 30% by weight relative to the total weight of the ink.

8. A non-aqueous gel writing ink according to claim 1, wherein it contains additives.

9. A non-aqueous gel writing ink according to claim 1, wherein its viscosity measured at 20° C. with a cone-and-plate rheometer is of between 20 000 and 100 000 mPa·s, with a shear rate of $0.01s^{-1}$ and between 1500 and 15 000 mPa·s, with a shear rate of $100s^{-1}$.

10. A non-aqueous gel writing ink according to claim 1, wherein its viscosity is stable during storage for at least three months at 40° C. and 80% relative humidity.

11. Process for manufacturing a non-aqueous gel writing ink according to claim 1, wherein the fatty acid amide wax is activated by formation of a premix in a solvent, at a temperature of between 30 and 70° C., with a shear rate of between 20 and 25 m/s, before its addition in the writing ink containing the solvent, the silica particles and the coloring agent.

12. Process for manufacturing the non-aqueous gel writing ink according to claim 11, wherein the premix is added to the ink at a temperature of between 50 and 60° C.

13. A writing instrument containing a non-aqueous gel writing ink according to 1.

14. A non-aqueous gel writing ink according to claim 1, wherein the gelling agent comprises a mixture of hydrophilic silica particles and of a fatty acid amide wax.

15. A non-aqueous gel writing ink according to claim 1, wherein the gelling agent content is in the range 0.15-0.60%, by weight, relative to the total weight of the ink.

16. A non-aqueous gel writing ink according to claim 4, wherein the solvent is phenoxyethanol.

17. A non-aqueous gel writing ink according to claim 8, wherein the additives are chosen in the group consisting of thickening agents, clear drain agents, viscosity imparting agent, lubricant, dispersing agent and mixture thereof.

* * * * *